United States Patent [19]

St. John

[11] Patent Number: 5,354,242
[45] Date of Patent: Oct. 11, 1994

[54] AUTOMATIC BELT TENSIONER WITH AN ENCLOSED FLAT WIRE POWER SPRING AND IMPROVED ZEROING AND DAMPING MEANS

[76] Inventor: Richard C. St. John, 731 Bachtel St., SE., North Canton, Ohio 44720

[21] Appl. No.: 958,089

[22] Filed: Oct. 8, 1992

[51] Int. Cl.$^5$ .................................... F16H 7/12
[52] U.S. Cl. .................................... 474/135; 474/117
[58] Field of Search .............. 474/117, 119, 133, 135

[56] References Cited

U.S. PATENT DOCUMENTS

| | | | |
|---|---|---|---|
| 4,473,362 | 9/1984 | Thomey et al. | 474/135 |
| 4,557,709 | 12/1985 | St. John | 474/117 |
| 4,596,538 | 6/1986 | Henderson | 474/135 |
| 4,696,663 | 9/1987 | Thomet et al. | 474/133 |
| 4,698,049 | 10/1987 | Bytzek et al. | 474/135 |
| 4,767,383 | 8/1988 | St. John | 474/133 |
| 4,784,631 | 11/1988 | Henderson | 474/117 |
| 5,030,171 | 7/1991 | Henderson | 474/135 |
| 5,195,932 | 3/1993 | Hirai et al. | 474/135 |

*Primary Examiner*—Douglas D. Watts
*Attorney, Agent, or Firm*—Reese Taylor

[57] ABSTRACT

A belt tensioning system for maintaining consistent and constant tension in a serpentine drive system consisting of a series of pulleys and an endless belt interconnecting the pulleys. The tensioning system includes a power spring with an appropriate nominal torque and rate which acts on the idler pulley, and through the idler pulley on the belt, and is suitable to maintain sufficiently constant tension over a broad range of belt length variations and pulley locations while providing damping sufficient to prevent undue pulley oscillation over a broad range of vibration conditions. In one form of the invention, the spring itself is fixed at one end to the prime mover and the other end to a tensioner arm so as to operate on the idler pulley and maintain the belt tension and provide the damping. The hysteresis of the spring responding to pulley movement thus assists in the damping. In another form of the invention additional damping is provided by a spring loaded band brake. Both the spring and the damping brake are completely enclosed within the tensioner housing. The provision of a variable anchoring point for fixing the spring to the prime mover makes it possible to alter the angular orientation of the spring to provide the optimal initial spring torque which encourages optimum initial belt tension and so improve drive life.

15 Claims, 4 Drawing Sheets

AUTOMATIC BELT TENSIONER WITH AN ENCLOSED FLAT WIRE POWER SPRING AND IMPROVED ZEROING AND DAMPING MEANS

FIELD OF THE INVENTION

This invention relates, in general, to serpentine belt drive systems and relates, in particular, to a tensioner for and a method of constantly and consistently applying and maintaining belt tension in the system to prevent undesirable slippage, over tensioning, and possible belt and component failure, as well as to restrict undesirable oscillation and to inhibit the entrance of contaminants into the tensioner through spring retention openings.

DESCRIPTION OF THE PRIOR ART

While the invention is generally oriented towards automotive applications, it is equally applicable in any commercial, industrial, domestic, or other application in which a serpentine drive is employed. A serpentine drive generally consists of three or more pulleys, including the tensioner pulley. Automotive systems which employ crankshaft driven alternator, water pump, power steering pump, air pump, and air conditioning compressor pulleys that are driven through both the front and the back sides of the belt provide common examples of serpentine drives.

The significant prior art revolves around tensioners with round wire helical torsion springs that are well exemplified by Thomey et al U.S. Pat. Nos. 4,473,362 and 4,696,663, and tensioners that employ flat wire power springs as revealed by St. John U.S. Pat. No. 4,557,709 and Henderson U.S. Pat. No. 4,596,538. The geometry required of a tensioner to provide constant tension is discussed in St. John U.S. Pat. No. 4,767,383.

Coulomb damping in the form of frictional forces and torques that oppose motion have become the accepted method of inhibiting unwanted tensioner oscillations, even though such inhibition causes variation from constant target tension. Thomey and others employ pivot friction that varies approximately as belt tension to provide proportional damping, and Thomey U.S. Pat. No. 4,696,663 also discloses the provision of additional damping that is proportional to spring torque with a friction brake that is energized by the tensioner spring.

St. John U.S. Pat. No. 4,557,709 discloses proportional Coulomb damping by pivot friction and intercoil friction of the flat wire power spring. This patent also offers asymmetric constant torque Coulomb damping from a pivoted shoe brake arrangement that is self energized in one direction of rotation, self de-energized in the other direction, and is actuated by dedicated springs. Henderson U.S. Pat. No. 4,596,538 also discloses a power spring, but reduces intercoil friction damping with a low friction plastic strip between the spring coils. This disclosure uses pivot friction to derive some proportional damping, but also relies on an axial disc brake that is actuated by a wave spring to provide constant friction torque.

Thomey discusses the direction of spring and belt forces and their reactions and the effect of them on the pivot bearings and damping in U.S. Pat. No. 4,473,362. Major points of that discussion are that all of the major forces should be aligned in the radial direction to increase damping friction, and that external (belt load) and internal (spring) forces must be balanced by a bearing reaction force. Henderson U.S. Pat. No. 5,030,171 adds an arm plate to provide an axial force to counteract the effect of overhung belt loads, i.e., belt forces that act perpendicular to the longitudinal axis of the pivot bearing and whose line of action does not pass between the physical limits of the pivot bearing.

All of the prior art tensioners referred to, except that of Thomey U.S. Pat. No. 4,696,663, have voids in the housings to permit hooking one end of the spring. Henderson U.S. Pat. No. 5,030,171 shows an added elastomeric insert to close the void. The void in the housing allows contaminants, such as salt water and particulate matter to enter the tensioner and both corrode parts and cause unwanted friction.

Belt tension is a function of tensioner location between the pulleys that straddle it, pulley sizes, and spring torque. In the ideal situation, the spring torque at a nominal position will be exactly that required to provide the target tension at that position, and the geometry of the system will be such that the decaying torque from the tensioner spring will exactly match the torque demands of the system to maintain unvarying tension regardless of tensioner arm rotation within the working limits of the system. The general mathematical relationships for this geometry are well known and summarized by St. John in U.S. Pat. No. 4,557,709.

Analysis of numerous systems demonstrates that idealized system requirements can often be met, and that although spring rate is very important to optimum performance, its importance is outweighed in many systems by the spring torque in the nominal position. The nature of spring manufacture is such that spring torque at any target (the nominal) angle of deflection varies significantly both from lot to lot, and from spring to spring. However, individual springs generally provide the same torque at the same angle of rotation in a very repeatable manner. The practice of extending springs through the housing of the tensioner discourages matching individual, or even lots of springs to the drive system requirements.

The present invention represents improved means of enclosing the moving parts of the tensioner, providing damping, and controlling target tension.

SUMMARY OF THE INVENTION

Figures 11, 11A, 15:
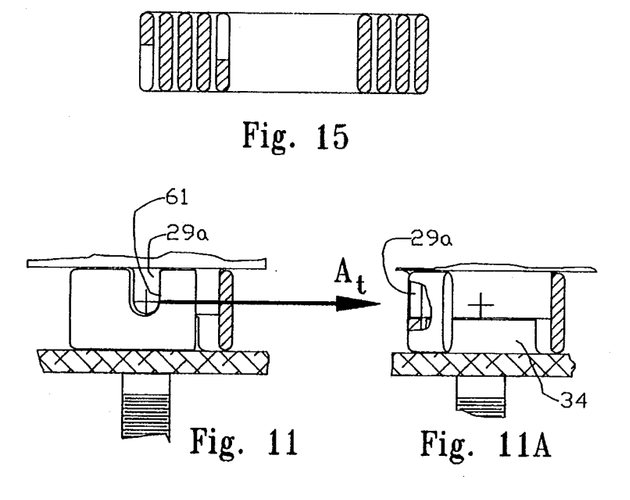
FIG. 11 and FIG. 11A are cutaway views showing the spring cooperating with inner spring lug on the arbor (arm), and the hidden relationship between the housing boss and the spring.
FIG. 15, 15A, 15B and 15C are a series of views of the spring used with this invention including a plan view sectioned at the midpoint, and an elevational view showing the slot to engage the outer spring lug, an elevational sectional view showing the profile of the slot that engages the inner spring lug, and an elevation section that shows the cross section views of both slots.
Figures 12, 12A, 13, 14, 16:
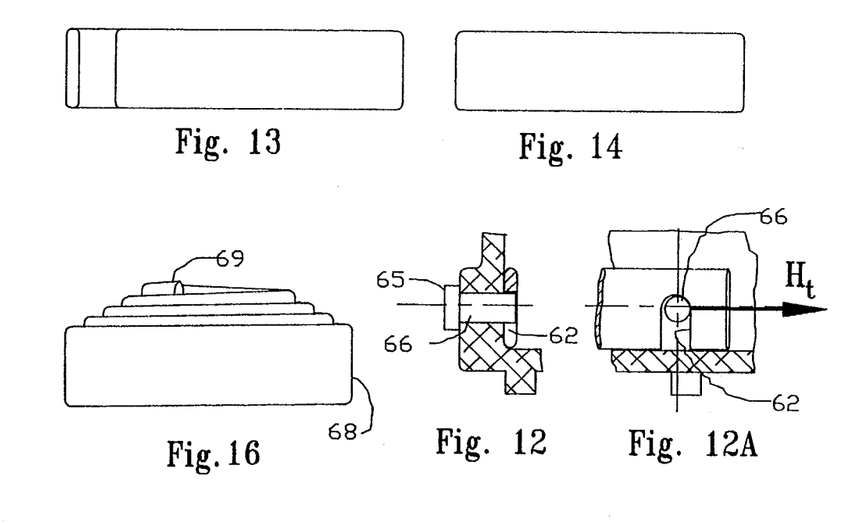
FIG. 12 and FIG. 12A are cutaway views showing the spring cooperating with the insertable spring lug and the housing.
FIG. 13 and FIG. 13A are elevational and plan views, respectively, of a conventional power spring with hooked ends illustrating the forces that must act on the spring to provide static equilibrium.
FIG. 14 and FIG. 14A are elevational and plan views, respectively, of the power spring used in this invention illustrating the forces that must act on the spring to provide static equilibrium.
FIG. 16 is an elevational view showing a conical power spring configured for this invention.
Figure 13A:
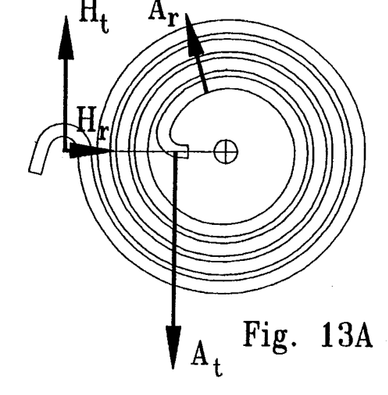
Figure 14A:
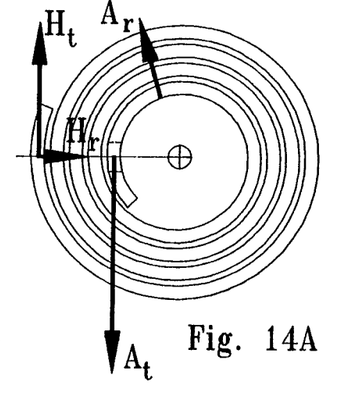
Figure 15A:
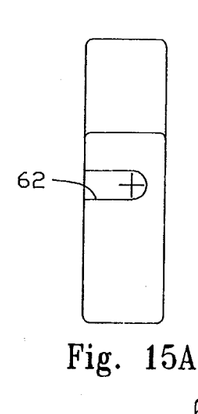
Figure 15B:
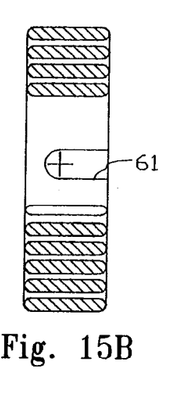
Figure 15C:
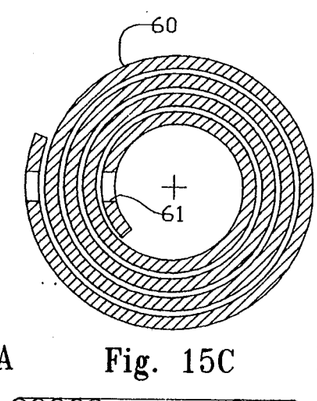

A study of power springs shows that the circular housing that retains the unclamped spring end exerts only two forces on the spring. One is a tangential force that opposes spring rotation and the other is a radial force that is directed inward towards the center of the spring when the spring is wound. These forces are depicted by $H_t$ and $H_r$ of FIG. 13. Consequently, there is no operative reason for a void in the wall of the housing to accommodate the hooked outer end of the power spring and the spring of FIG. 15 can provide the identical function as the hooked spring of FIG. 13 by apply tangential and radial forces as shown by FIG. 14. A free body analysis such as that which is commonly used by those versed in the art of mechanical engineering demonstrates that the magnitude and angular orientation of the forces at the torque transmitting inner extremity of the spring will ultimately have to directly oppose the vector sum of $H_t$ and $H_r$ in both magnitude and direction. This resultant force defines the reaction on the pivot bearing of the tensioner due to the spring. Further examination of the force reactions predicts that the location of the fastening point of the spring at the housing end is approximately 180° from the nominal orientation of the pulley in the system with a new belt.

Examination of forces in the axial direction of the pivot bearing shows that if the pivot bearing has sufficient length and the forces acting on both the pulley and the pivoted end of the arm are known, a bearing reaction that provides continuous bearing contact under all conditions of loading is possible. It is also desirable that the axial center of pressure coincide with the geometric center of the bearing to minimize contact pressure and wear, however asymmetric loading is practical if the product of the maximum local bearing pressure and rubbing velocity (PV) do not exceed specific limits. In the present invention this is achieved by orienting the spring and the brake reaction forces to coincide with the belt forces acting on the pulley in the optimum orientation. The optimum orientation is a matter of design details of each particular system.

In summary, the present invention is intended to achieve constant tensioning of the drive system by effectively attaching one end of a power spring that is selected to be the best trade off between system requirements and physical limitation to a pivotal arm that carries a tensioner idler pulley which applies tensioning force to the system drive belt. The other end of the spring is attached to a housing that is fixed with regard to the drive system. An example of this fixing is to key and bolt the housing to an automotive engine block or bracket to which all of the components that are driven by the belt are also attached. This arrangement causes the spring to continuously force the tensioner idler pulley into contact with the belt and so insures that the belt always experiences a tension force even though it shortens and lengthens as system drive loads change, and stretches with age. The selection of a spring with the proper initial torque and spring rate for the application insures that the tension will remain constant regardless of belt stretch.

Many drives encounter fluctuations in power that are manifested as variations in belt tension requirements. These changes in tension requirements may cause the tensioner arm to oscillate or appear to vibrate in an undesirable manner. The undesired oscillations or vibration can be countered by a force that opposes all motion, i.e., damping. In the present invention, a spring biased strap brake damper that acts on a brake drum that is integral with the pulley carrying arm is provided for reasons of simplicity, reliability, and its inherent asymmetric damping ability that supplements the inherent, proportional symmetrical intercoil friction and pivot friction damping of the tensioner. The primary cause of tensioner oscillations is the sudden increases in belt tension caused by accessory load changes, pulley eccentricity, and engine firing and other torsional vibrations. Inasmuch as the belt can only drive the tensioner in the direction that winds the tensioner spring, damping that opposes belt tightening will reduce the amplitude of the oscillation. Once the tensioner arm has rotated to its maximum excursion and has reached zero velocity, it must return to a nominal position to provide target tension and/or be ready for the next oscillation. Torque from the tensioner spring is the only means available to return the idler pulley from its maximum excursion to its mean position, and any damping in the spring unwinding direction opposes and slows the return. Consequently, if damping is equal in both directions of arm rotation, the magnitude of the damping that limits the amplitude of the oscillation also restricts the return of the arm, and a high magnitude of damping means a slow return. The net result of this phenomena is to case the tensioner arm to oscillate around a mean position that is different than the static mean position, and consequently cause lower than planned mean tension. If the tensioner is properly asymmetrically damped, a large damping torque will be available to oppose belt tightening and so restrict the angle of arm rotation (amplitude), and only a small damping torque will oppose the spring in returning the arm to its mean position. Restated, the asymmetric damper reduces the amplitude of oscillation so the spring does not have to return the arm through such a large angle and at the same time leaves more torque to provide greater acceleration to increase the return velocity and reduce the return time of the arm. The result of this asymmetric action is to provide a tensioner that will respond to higher frequency oscillations and still maintain effective tension levels.

The present invention also contemplates a seal between the fixed housing and the rotating arm. The function of the seal is to keep out particulate matter and moisture, although it is not contemplated that the seal will protect against immersion. Consequently, a seal that is simply a low force barrier is deemed sufficient for most tensioner applications.

The slotted ends of the power spring not only engage protruding lugs, but permit spring assembly to be made with axial motions. There are situations in which it is desirable to completely engage the spring with the spring lugs in an axial motion, and then perform a rotary or winding motion prior to an axial motion that completes the assembly. The present invention contemplates a conically wound power spring that looks much like a volute spring to permit such an assembly operation to take place. A preliminary stress analysis of a 17" long spring that is stressed to 200,000 psi. in bending and is wound to provide a $\frac{3}{8}$" high cone shows that only 20 pounds is required compress the spring flat and that the combined bending stresses are approximately 204,000 psi. Another major advantage of the slotted end configuration is that it permits a more compact design for springs of equal torque and rate.

The present invention provides for an integral internal lug in the spring housing to retain the outer end of the spring and a similar lug on the arbor that is a part of the pulley carrying arm to transmit torque to the arm. A snailed arbor is contemplated to guide the first coil over the innermost end of the spring and so reduce rubbing and bending stresses. In this manner, the entire spring is contained within the envelope of the inner surfaces of the housing and the arm. The integral inner lug is suitable for applications that can accept the torque variations that occur because of variations that occur in the spring manufacturing process. In some cases significant increases in belt and component life, and reduction in maintenance can be derived from more precise initial spring torque which is directly translated into more accurate belt tension which promises less slip on the one hand and less over tensioning on the other hand. To satisfy the need for more precise initial torque, provision has been made for an insertable outer lug to retain the outer end of the spring. The advantage to the insertable outer lug is that housings and springs can be manufactured prior to assembly within the limits of natural production processes. Then, during or near the time of spring/housing assembly, the housing is drilled to accept the insertable outer lug which may be assembled either before or after the spring has been placed in the housing to facilitate assembly. A method that has been used with the end function concept of an insertable outer lug is to statistically evaluate a sample of springs from the production lot, determine the best mean position of the spring end, and then drill all of the housings that use that lot of springs at the optimum angle. Modern technology also permits measuring the torque output of each spring at a predetermined target angle and then drilling each housing to match each particular spring with only a modest cost penalty that is mitigated by reduced spring manufacture and final inspection costs, less line scrap and lower end product warranty costs.

Accordingly, production of an improved belt tensioner system of the character above described becomes the principal object of this invention with other objects thereof becoming more apparent upon a reading of the following brief specification considered and interpreted in view of the accompanying drawings.

BRIEF DESCRIPTION OF THE PREFERRED EMBODIMENTS

Figures 1, 17, 18:
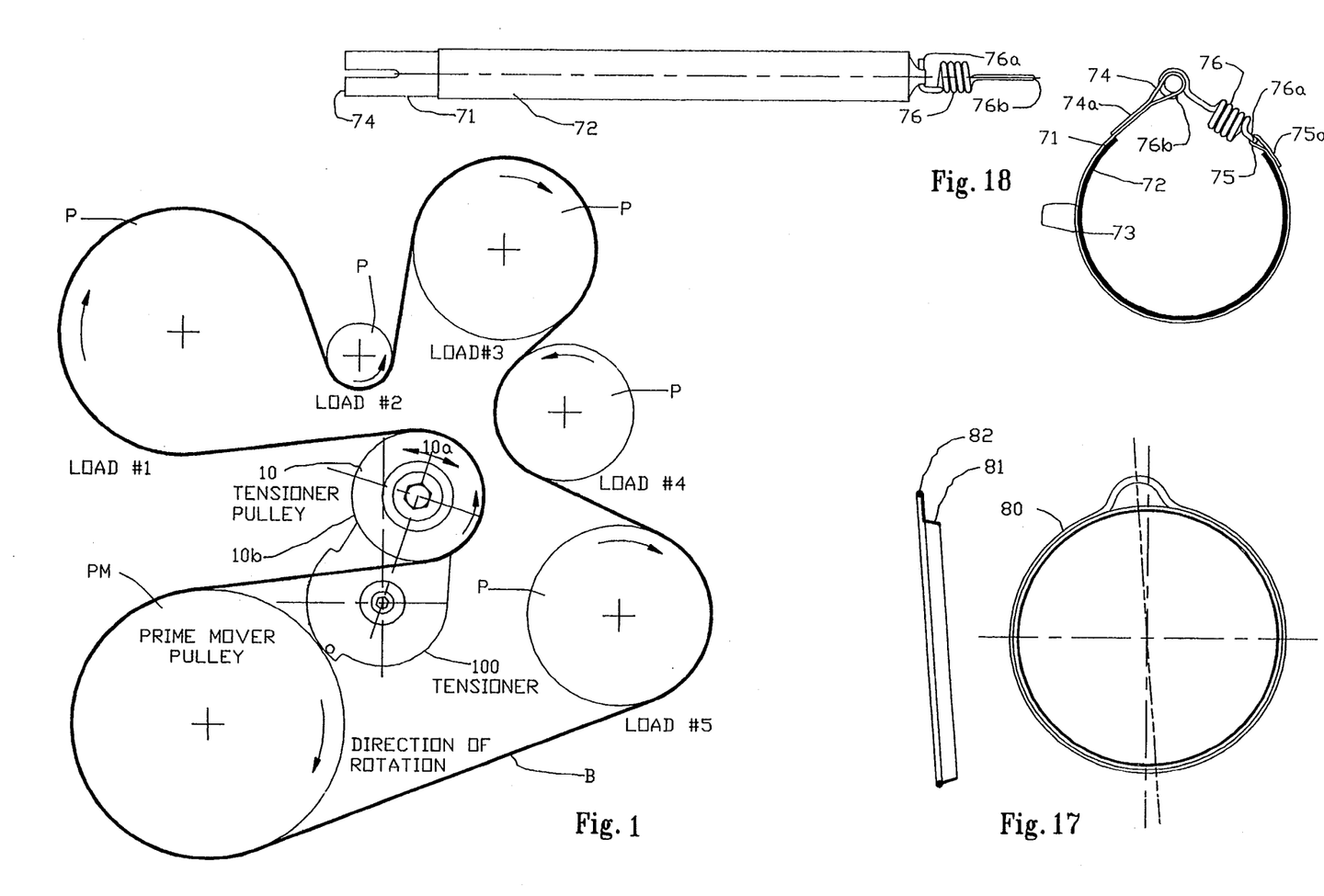
FIG. 1 is a schematic view of a typical serpentine drive belt system.
FIG. 17 is a plan view and a sectioned elevational view of the seal of this invention.
FIG. 18 is a plan view of the brake assembly as it is installed in the tensioner and an elevational view of the brake assembly in the flat mode as viewed from the friction surface.
Figures 2, 3, 4, 5:
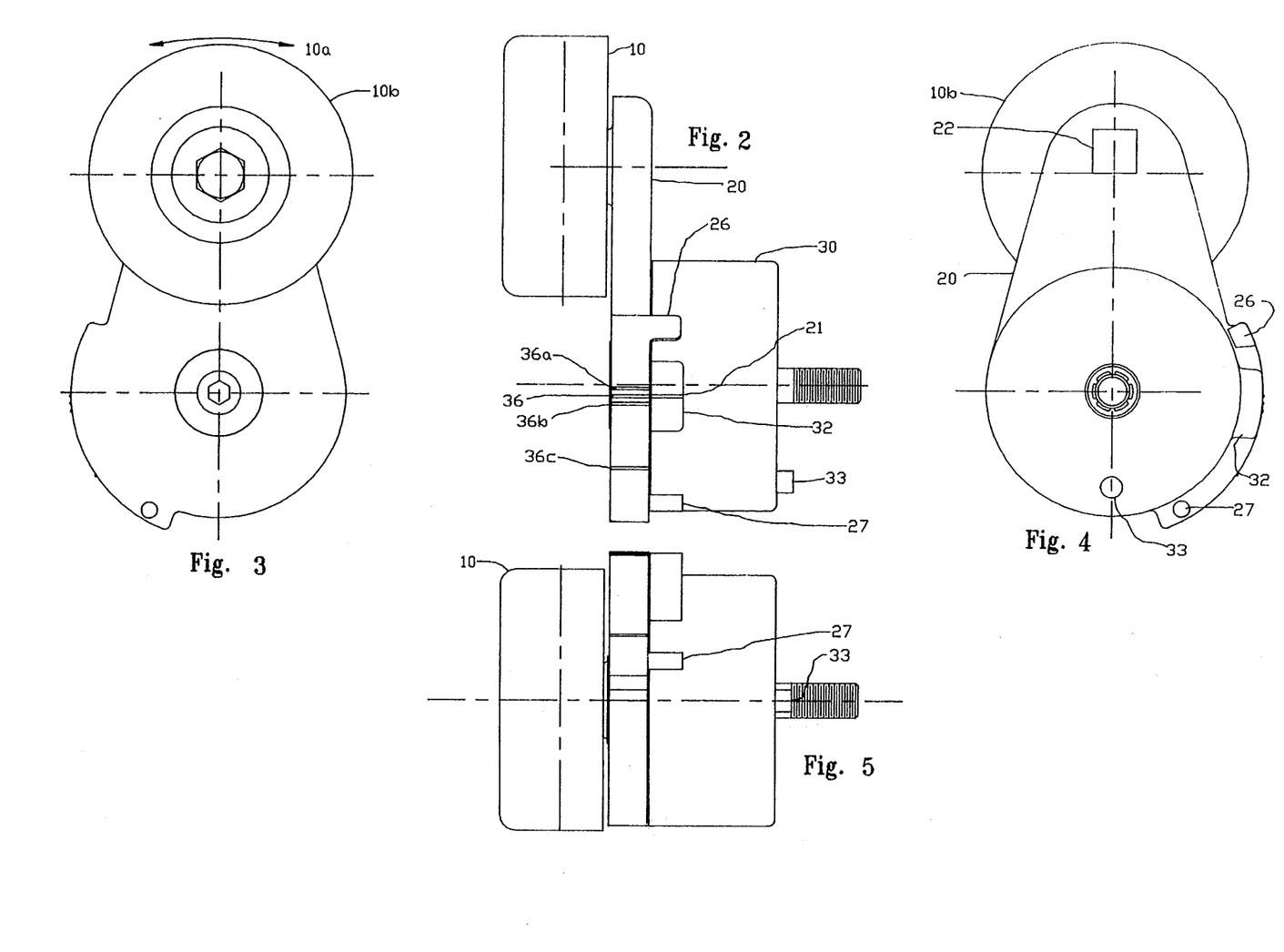
FIG. 2 is a side elevational view of one embodiment of the invention.
FIG. 3 is a top view of FIG. 2.
FIG. 4 is a bottom view of FIG. 2.
FIG. 5 is a rear elevational view of FIG. 2.

Referring first to FIG. 1 of the drawings which schematically shows a typical serpentine belt drive system, it will be noted that the tensioning system includes an idler or tensioner pulley, generally indicated by the numeral 10, and a tensioner, generally indicated by the numeral 100, which is connected to the pulley 10 by a common arm so that the tensioner 100 acts on and controls the pulley 10. The system also includes a plurality of driven pulleys or sheaves P which represent and provide the load placed on the system, and a prime mover or driving pulley PM all interconnected by an endless belt B. Thus, the tensioner 100 is intended to act on the belt B through idler pulley 10 to maintain constant and consistent tension thereon as will now be described.

It will be understood that prime mover pulley PM is driven by the prime mover, often an engine through a crank shaft (not shown) and that the driven pulleys P are connected to various system accessories such as a water pump, alternator, etc. It should also be understood that the tensioner 100 is secured to a suitable mounting point on the prime mover structure, such as an engine block, by suitable means, which will be described herein, and is capable of pivotal movement about its mounting point so that movement is possible in the direction of the arrow 10a in response to movement of the belt B and to forces imparted by the tensioner 100 as will be described.

Figures 6, 7, 8, 9, 10, 19:
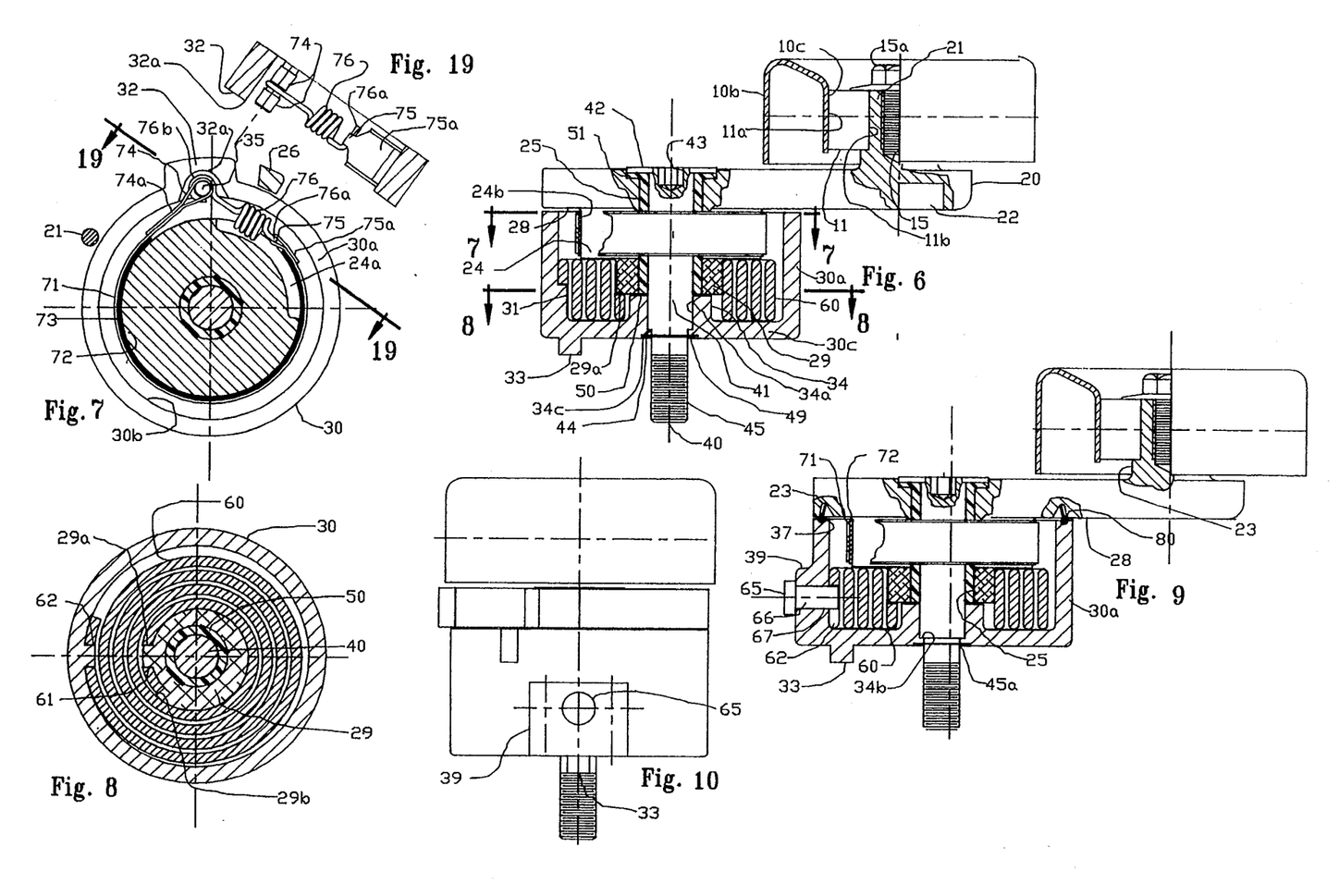
FIG. 6 is a partial sectional view of FIG. 2 when the outer spring lug is integral with the housing, and no seal is used.
FIG. 7 is a sectional view taken along the line 7—7 of FIG. 6.
FIG. 8 is a sectional view taken along the line 8—8 of FIG. 6.
FIG. 9 is a partial sectional view similar to FIG. 6 when the insertable spring lug and seal are used.
FIG. 10 is a rear elevational view of FIG. 9.
FIG. 19 is a partial sectional view of the housing taken along the line 19—19 of FIG. 7 showing the attachment of the brake to the anchor.

Referring first then to FIGS. 1 through 8 for a description of one form of the invention, it will be noted that the tensioner pulley 10 normally contacts belt B at its outer periphery 10b (see FIG. 6) and is engaged on its inner periphery 10c with the outer diameter 11a of a conventional ball bearing 11 (see FIG. 6). The ball bearing 11, in turn, has an inner diameter 11b through which a cylindrical boss 21 of the tensioner arm 20 passes thus causing the pulley outer periphery 10b to engage the belt B and rotate freely about the longitudinal axis of the boss 21.

Still referring to FIGS. 6 and 9, the pulley 10 is retained on the tensioner arm 20 by a screw 15 or other appropriate means such as staking, spinning, or a retaining ring which restrains the inner periphery 11b of the ball bearing 11 from motion in the axial direction away from the tensioner arm 20. Motion in the opposite direction is restricted by a second cylindrical boss 23 that extends from the tensioner arm 20 and is of a larger diameter and located on the same longitudinal axis as boss 21.

The tensioner 100 may be hand rotated against its spring to permit tensioner testing and other operations, and positioning of the belt during installation and service by applying a wrench to the head 15a of the screw 15 which can have either right or left hand threads to cause the screw to tighten as the tensioner is "cocked", or rotated to wind the spring. If access to the screw head 15a is restricted or if other reasons make using the screw undesirable, the rectangular cocking socket 22 in tensioner arm 20 may be used with an appropriate tool to apply spring winding torque in either direction.

Referring to FIG. 6, the tensioner arm 20 has a cylindrical inner bore 25 about which is disposed a larger cylindrical drum 24 positioned adjacent the inner face 28 of the arm 20, and a smaller "snailed" shaped arbor 29 (see FIG. 8) that extends from the drum 24 to become the arbor for the spiral power spring 60 which will be described in greater detail below. An inner spring lug 29a extends radially from the smaller radius section of the spiral shaped arbor 29 and is displaced radially from the maximum diameter of the spiral shaped arbor 29 to permit installation of the spiral power spring 60 as will be described. A spring arbor that is of the spiral configuration just described is called a snailed arbor because it is a spiral that is terminated sharply at its maximum diameter to form a step just as the shell of a snail does.

Common practice is to make the tensioner arm 20 of an aluminum alloy and when large volumes are required die casting is the process of choice for both the tensioner arm 20 and the housing 30.

A plastic pivot bearing 50 with a flanged end 51 is inserted into the inner bore 25 of the arm 20. The pivot bearing 50 is of a high strength, low wear material such as a bearing grade polyamide-imide such as AMOCO Torlon ®, although a polyamide such as Dupont Zytel ® has also been used successfully in low load, high friction applications.

The housing 30 is generally cylindrical in shape and encloses such components as drum 24, spiral shaped arbor 29 and power spring 60. It also has an inwardly extending boss 34 which provides a through bore 34a. A pivot bolt 40 passes through the pivot bearing 50, and through the bore 34a of the housing boss 34 of the housing 30. The pivot bolt 40 has an elongate body 41 which has a threaded end 45 and an offset or stepped shoulder 44 which rests on shoulder 34b of boss 34. The pivot bolt 40 is also prevented from axial displacement by a retaining ring 49 received in recess 34c of the housing. The retaining ring 49 only serves to keep the tensioner parts together during handling after assembly and performs no function after the tensioner is assembled in the drive system. The pivot bolt 40 also has a fiat head 42 and a central hexagonal socket 43 that accepts standard hexagonal wrenches on its unthreaded end.

The housing 30 of the tensioner includes a tubular wall 30a, a fiat plate bottom 30c and the tubular boss 34 which is concentric and coaxial with the tubular wall 30a. A locating lug 33 is radially displaced from the central axis of the tubular wall 30a and extends outwardly from the bottom 30c. An integral outer spring lug 31 extends inwardly from the wall 30a and upwardly from the bottom 30c. This lug 31 generally conforms to the outer spring slot 62 of the power spring 60 which fits over the lug 31 when the spring is installed and operating in the tensioner.

The integral outer spring lug 31 may be replaced by an insertable outer spring lug 66 (see FIG. 9) which extends through the tubular wall 30a to engage the spring 60 through the outer spring slot 62 and whose intrusion into the inside of the housing is limited by an integral head 65. In higher torque applications, a boss 39 may be added to the housing 30 to support the insertable outer spring lug 66 as shown in FIG. 9.

The power spring 60 is inserted into the housing 30 and is oriented to cause the outer spring slot 62 in the spring 60 to fit over the outer spring lug 31 or 66, whichever design is used. The spring is wound when the arm 20 is rotated counterclockwise as the tensioner is viewed in FIG. 1, however other tensioner and system orientations may require winding in the clockwise direction.

When this rotation occurs, the inner spring lug 29a on the arm engages the inner slot 61 of the spring 60 and causes the spring to rotate with the arm 20 with the spring resisting motion in the well known manner of springs. The outer spring lug 31 or 66 and the outer slot 62 are sufficient to retain the spring 60 during winding because the spring always presses against the inner surface of wall 30a of the housing 30 during normal spring winding and unwinding events. This is illustrated by the radial housing force $H_r$ shown by FIG. 14 which restrains the spring and is the result of the spring pushing against the housing wall at its inner periphery 30b. The spring winding torque is resisted by the tangential force $H_t$ exerted on the outer spring lug 31 or 66 as is shown by FIG. 14 and FIG. 12. The spring winding and other torques are resisted by the pivot bolt 40 and the locating lug 33 which enter into mating cavities in the prime mover housing (not shown).

A strap brake 70 is also contemplated and functions according to the well known principles of strap brakes and is shown by FIGS. 6, 7, 9, 18 and 19. In this invention, the strap brake 70 consists of a generally metallic brake band 71 with a looped end 74 which passes over the brake anchor 35 which may be integral with the housing 30 and looped end 75 that accepts the straight end 76a of the brake spring 76, and to which friction material 72 is bonded. The loops 74 and 75 are formed by turning the band 71 material back on itself and fastening the ends to the band 71 by such well know processes as spot or projection welding. Friction material 72 is bonded to the band 71 at the bond line 73. It is possible in some low torque applications that the brake band 71 and the friction material 72 can be made of one or more combinations of organic material such as nylon.

The brake spring 76 is a helical extension spring with one end 76b formed in a loop to pass over the brake anchor 35 and the other end 76b bent at 90° to the longitudinal axis of the spring 76 and passed through the small loop 75 of the brake band 71. Braking occurs when the strap brake 70 is passed around the drum portion 24 of the tensioner arm 20 and the brake spring 76 is extended causing tension in the strap brake which causes the friction material 72 to be compressed against the brake drum 24. As a result of this compression, any rotation of the arm 20 will be resisted by friction between the friction material 72 and the brake drum 24. The nature of simple strap brakes such as this is that when the drum 24 is rotated towards the brake spring 76, more friction (self energization) will occur than when the drum 24 is rotated away (self de-energization) from the spring 76. This results in the asymmetric damping previously described so the tensioner depicted in FIG. 1 will vigorously resist increases in belt tension, but will have little internal resistance to creating belt tension hence will be able to operate satisfactorily at higher frequencies than equivalent tensioners that are symmetrically damped.

Inasmuch as it is desirable to maximize the size of the brake drum 24 given the constraints of the interior of the housing 30, a recess 24a may be formed in a portion of the periphery of the brake drum 24 to allow the brake spring 76 to intrude into the brake drum 24 envelope. This is permissible without impairing brake operation because the spring 76 always maintains the same low tension and low friction material 72 wear rate in the brake adjacent to the spring 76 while the other end of the brake experiences high tension and more wear.

When the spring 60, strap brake assembly 70, pivot bearing 50, and pivot bolt 40 are all assembled together with the tensioner arm 20 and the housing 30, the tensioner spring 60 is ready to be wound. Winding is done by rotating the arm 20 with respect to the housing 30 until the wind stop 26 on the arm 20 contacts the rotation limiting lug 32 on the housing 30.

It is generally necessary to prevent complete unwinding of the spring when the winding torque is withdrawn both for functional reasons and to prevent the idler pulley 10 from possibly striking other system components in the event of belt failure or during belt installation or replacement. Complete unwinding is prevented by installing a maximum travel stop 27 in the arm 20 as shown while the power spring 60 is nearly fully wound, and then releasing the winding torque. Unwinding will cease when minimum travel stop 27 contacts the rotation limiting lug 32 of said housing.

It is generally desirable to determine if the angle of the arm 20 is at an appropriate position. To ease this approximate determination, a witness mark 21 is provided on the housing. This witness mark can then be compared to the nominal length belt at installation mark 36, the minimum length at installation belt mark 36a, the maximum length at installation belt mark 36b, and the maximum stretched belt at wear out mark 36c.

It is often desirable to make the maximum travel stop 27 integral with the arm 20, however it is then essentially impossible to move the cylindrical spring 60 axially after appreciable winding has taken place, thus preventing winding of the spring prior to its insertion into the housing. This objection can be countered by replacing the spring 60 with the spring 68 (see FIG. 16) which is identical to spring 60 except that the coils are wound to form a cone instead of a cylinder. The conical spring thus presents a continually rising profile with the highest point being the inner end 69 of the spring which is adjacent to the inner slot 61. This configuration permits prewinding the tensioner with an integral maximum travel stop 27 with the spring 68 being wound prior to a final axial displacement of the spring and installation of the retaining ring 49.

There are also environmental conditions that cause unwanted contaminants to enter the tensioner through the small gap between the arm 20 and the housing 30. FIG. 9 depicts the tensioner of FIGS. 1 through 8 with a lip seal 80 positioned in an annular groove 37 in wall 30a of housing 30 and between the arm 20 and the housing. FIG. 17 depicts one configuration of the seal 80 which has a ring section 82 that follows a groove 37 in the housing 30 and a lip section that rides in a groove 23 in surface 28 of the arm 20. Seal sliding takes place between the flexible lip 82 and the arm groove 23.

The tensioner is attached to the prime mover structure by rotating the pivot bolt 40 with a hexagonal wrench in the hex socket 43 in manner that causes the pivot bolt threads 46 to engage mating threads in the prime mover structure and at the same time maintaining alignment between the locating lug 33 on the housing 30 with an appropriate cavity in the prime mover structure. If the prime mover structure does not have an appropriate threaded hole, it must have a clearance hole through which the pivot bolt 40 is inserted and an appropriate nut is threaded onto the bolt and tightened to clamp the tensioner to the prime mover structure.

There are also cases when the housing 30 can become part of a bracket that is independently bolted to the prime mover structure. When such a situation exists, the pivot bolt 40 is screwed directly into the bracket to complete the assembly and no retaining ring 49 is required.

The previous narrative describes a tensioner in which a pulley mounted to a damped, spring driven, bushed, pivotal arm generates and maintains tension in a traction belt by causing the pulley to forcibly engage the belt. The spring and attachments are so configured that they are completely enclosed in the tensioner house. The damping is asymmetric to reduce the magnitude of belt induced oscillation of the tensioner arm and to encourage more rapid return to the rest position when such an oscillation does occur. The tensioner also has provision to adjust the initial position of the spring to permit target torque at an initial position to be more precisely arrived at. Further, the tensioner has a provision for sealing the gap between the moving parts, and can be made integral with an engine bracket if required.

What is claimed is:

1. An automatic belt tensioner for use in a serpentine belt drive system located on a machine, comprising:
   a) a tensioner arm;
   b) a tensioner pulley attached to said tensioner arm for engagement with the belt;
   c) a housing pivotally attached to said tensioner arm and fixed to the machine;
   d) a slotted power spring disposed within said housing and having its one end secured to the inner wall of said housing and its other end operatively connected to said tensioner arm; and
   e) an insertable lug selectively positioned in the wall of said housing to secure said one end of said spring whereby the point of securement of said spring to said housing is variable.

2. The automatic belt tensioner of claim 1 wherein an asymmetric brake means are disposed within said housing and operatively interconnect said housing and said tensioner arm.

3. The automatic belt tensioner of claim 1 wherein a flexible lip seal is disposed between said housing and said tensioner arm; and said spring is enclosed within the space defined by said housing, said seal and said tensioner arm.

4. The automatic belt tensioner of claim 1 wherein said slotted power spring is a cylindrical spring.

5. The automatic belt tensioner of claim 1 wherein said slotted power spring is a conical spring.

6. The automatic belt tensioner of claim 2 wherein a seal is disposed between said housing and said tensioner arm; and said power spring and said brake means are enclosed within the space defined by said housing, said seal and said tensioner arm.

7. The automatic belt tensioner of claim 6 wherein said power spring is a cylindrical spring.

8. The automatic belt tensioner of claim 6 wherein said power spring is a conical spring.

9. The automatic belt tensioner of claim 3 wherein said power spring is a cylindrical spring.

10. The automatic belt tensioner of claim 3 wherein said power spring is a conical spring.

11. The automatic belt tensioner of claim 3 wherein brake means are disposed within said housing and operative interconnect said housing and said tensioner arm.

12. The automatic belt tensioner of claim 11 wherein said power spring is a cylindrical spring.

13. The automatic belt tensioner of claim 11 wherein said power spring is a conical spring.

14. An automatic belt tensioner for use in a serpentine belt drive system located on a machine, comprising:
   a) an elongate tensioner arm;
   b) a tensioner pulley rotatably attached to said tensioner arm for engagement with the belt;
   c) a housing attached to said tensioner arm and fixed to the machine;
   d) said housing including a cup-shaped body;
   e) a slotted power spring disposed within said cup-shaped body of said housing and having its one end secured to the inner wall of said housing and its other end operatively connected to said tensioner arm;
   f) an arbor disposed within said cup-shaped body of said housing;
   g) said other end of said spring is attached to said arbor;
   h) a brake drum telescoped over said arbor; and
   i) brake means connected to said housing in encircling relationship with said brake drum.

15. An automatic belt tensioner for use in a serpentine belt drive system located on a machine, comprising:
   a) an elongate tensioner arm;
   b) a tensioner pulley rotatably attached to said tensioner rm for engagement with the belt;
   c) a housing attached to said tensioner arm and fixed to the prime mover;
   d) said housing including a cup-shaped body;
   e) a power spring disposed within said cup-shaped body of said housing and having its one end secured to said housing and is other end operatively connected to said tensioner arm;
   f) an arbor disposed within said cup-shaped body of said housing;
   g) said other end of said spring attached to said arbor;
   h) a brake drum telescoped over said arbor; and
   i) brake means connected to said housing in encircling relationship with said brake drum.

* * * * *

UNITED STATES PATENT AND TRADEMARK OFFICE
CERTIFICATE OF CORRECTION

PATENT NO. : 5,354,242
DATED : October 11, 1994
INVENTOR(S) : Richard C. St. John It is certified that error appears in the above-identified patent and that said Letters Patent is hereby corrected as shown below:

In Column 4, line 1, delete "case" and substitute therefor ---cause---;

In Column 7, line 40, delete "fiat" and substitute therefor ---flat---;

In Column 7, line 44, delete "fiat" and substitute therefor ---flat---;

In Column 10, lines 65-66, delete "operative" and substitute therefor ---operatively---;

In Column 12, line 7, delete "rm" and substitute therefor ---arm---; and

In Column 12, line 13, delete "is" and substitute therefor ---its---.

Signed and Sealed this

Twenty-seventh Day of December, 1994

Attest:

BRUCE LEHMAN

*Attesting Officer*   *Commissioner of Patents and Trademarks*